(12) United States Patent
Scott et al.

(10) Patent No.: US 10,824,902 B2
(45) Date of Patent: Nov. 3, 2020

(54) MISLABELED PRODUCT DETECTION

(71) Applicant: Shenzhen Malong Technologies Co., Ltd., Shenzhen (CN)

(72) Inventors: Matthew Robert Scott, Shenzhen (CN); Dinglong Huang, Shenzhen (CN); Le Yin, Shenzhen (CN); Sheng Guo, Shenzhen (CN); Haozhi Zhang, Shenzhen (CN); Weilin Huang, Shenzhen (CN)

( * ) Notice: Subject to any disclaimer, the term of this patent is extended or adjusted under 35 U.S.C. 154(b) by 0 days.

(21) Appl. No.: 16/422,834

(22) Filed: May 24, 2019

(65) Prior Publication Data

US 2020/0242392 A1    Jul. 30, 2020

Related U.S. Application Data

(63) Continuation of application No. PCT/CN2019/073390, filed on Jan. 28, 2019.

(51) Int. Cl.
| | | |
|---|---|---|
| *G06K 9/46* | (2006.01) | |
| *G06K 7/14* | (2006.01) | |
| *G06K 9/32* | (2006.01) | |
| *G06N 3/08* | (2006.01) | |

(52) U.S. Cl.
CPC ......... *G06K 9/4609* (2013.01); *G06K 7/1443* (2013.01); *G06K 7/1473* (2013.01); *G06K 9/3233* (2013.01); *G06N 3/08* (2013.01)

(58) Field of Classification Search
CPC .............. G06Q 20/202; G06Q 30/018; G06Q 30/0185; G06T 7/62
USPC ..................................... 705/21, 22, 23, 318
See application file for complete search history.

(56) References Cited

U.S. PATENT DOCUMENTS

| | | | |
|---|---|---|---|
| 2008/0077511 A1 | 3/2008 | Zimmerman | |
| 2009/0272801 A1* | 11/2009 | Connell, II | ........ G06K 7/10792 235/383 |
| 2010/0114623 A1* | 5/2010 | Bobbitt | .................. G06Q 20/20 705/16 |
| 2012/0005105 A1 | 1/2012 | Beier et al. | |

(Continued)

FOREIGN PATENT DOCUMENTS

| | | |
|---|---|---|
| CN | 101976396 A | 2/2011 |
| CN | 106204226 A | 12/2016 |

OTHER PUBLICATIONS

Chen, L. C., Papandreou, G., Kokkinos, I., Murphy, K., & Yuille, A. L. (2017). "Deeplab: Semantic image segmentation with deep convolutional nets, atrous convolution, and fully connected crfs." IEEE transactions on pattern analysis and machine intelligence, 40(4), 834-848.

(Continued)

*Primary Examiner* — George R Koch
(74) *Attorney, Agent, or Firm* — Shook, Hardy & Bacon L.L.P.; Charlie Zhao

(57) ABSTRACT

Aspects of this disclosure include technologies for detecting mislabeled products. In one embodiment, the disclosed system will capture an image of a product when the MRL of the product is scanned or being scanned. After recognizing the product in the image, the size of the area containing the product may be calculated. Subsequently, the disclosed system can determine whether the MRL mismatches the product in the image if this size of the area containing the product does not match the standard size associated with the MRL.

17 Claims, 9 Drawing Sheets

(56) References Cited

U.S. PATENT DOCUMENTS

| | | | |
|---|---|---|---|
| 2012/0027297 A1* | 2/2012 | Feris | G06K 9/34 |
| | | | 382/173 |
| 2014/0038802 A1 | 2/2014 | Clark et al. | |
| 2015/0193780 A1* | 7/2015 | Migdal | G06Q 30/018 |
| | | | 705/317 |
| 2015/0227946 A1 | 8/2015 | Huang | |
| 2017/0018094 A1* | 1/2017 | Todeschini | G01B 11/24 |
| 2019/0108396 A1* | 4/2019 | Dal Mutto | G06K 9/00771 |

OTHER PUBLICATIONS

Ge, Weifeng. "Deep metric learning with hierarchical triplet loss." In Proceedings of the European Conference on Computer Vision (ECCV), pp. 269-285. 2018.

Guo, Sheng, Weilin Huang, Haozhi Zhang, Chenfan Zhuang, Dengke Dong, Matthew R. Scott, and Dinglong Huang. "Curriculumnet: Weakly supervised learning from large-scale web images." In Proceedings of the European Conference on Computer Vision (ECCV), pp. 135-150. 2018.

Li, Zeming, Chao Peng, Gang Yu, Xiangyu Zhang, Yangdong Deng, and Jian Sun. "Light-head r-cnn: In defense of two-stage object detector." arXiv preprint arXiv:1711.07264 (2017).

Sandler, Mark, Andrew Howard, Menglong Zhu, Andrey Zhmoginov, and Liang-Chieh Chen. "Mobilenetv2: Inverted residuals and linear bottlenecks." In Proceedings of the IEEE Conference on Computer Vision and Pattern Recognition, pp. 4510-4520. 2018.

Xia, Gui-Song, Xiang Bai, Jian Ding, Zhen Zhu, Serge Belongie, Jiebo Luo, Mihai Datcu, Marcello Pelillo, and Liangpei Zhang. "DOTA: A large-scale dataset for object detection in aerial images." In Proceedings of the IEEE Conference on Computer Vision and Pattern Recognition, pp. 3974-3983. 2018.

International Search Report and Written Opinion dated Oct. 31, 2019 in International Patent Application No. PCT/CN2019/073390, 9 pages.

\* cited by examiner

MISLABELED PRODUCT DETECTION

This application is a continuation of PCT/CN2019/073390, filing date Jan. 28, 2019.

BACKGROUND

Barcodes, ubiquitously affixed to most commercial products in the modern economy, have made automated checkout and inventory tracking possible or more efficient in all retail sectors. A barcode, seemingly a trivial piece of label, can encode optical, machine-readable data. The universal product code (UPC) is a barcode symbology, mainly used for scanning of trade items at the point of sale (POS). Barcodes, particularly UPC barcodes, have shaped the modern economy, not only universally used in automated checkout systems, but used for many other tasks, referred to as automatic identification and data capture.

Barcodes are initially developed in linear or one-dimensional (1D) forms. Later, two-dimensional (2D) variants were developed, such as quick response code (QR code), for fast readability and greater storage capacity. Barcodes are traditionally scanned by special optical scanners called barcode readers. In recent years, computing devices, such as smartphones with cameras, coupled with suitable software, can also read barcodes.

A checkout system will work correctly only if a barcode label is affixed to a correct item. Many retailers have acknowledged a widespread fraud, known as ticket switching or price switching. A lower-priced ticket, such as a UPC label or radio-frequency identification (RFID) tag, is fraudulently placed on a higher-priced item, so that the higher-priced item can be purchased for less. The lower-priced barcode label may be removed from a lower-priced item. Alternatively, fake labels could be manufactured nowadays from a personal computer. A watchful cashier may recognize an attempt of ticket switching. However, there are no practical effective solutions to prevent or defeat such fraud associated with self-checkout systems. Resultantly, ticket switching has caused shrinkage and erroneous inventory information for retailers, which may further implicate the supply chain and economy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of this disclosure include an efficient approach to detect mislabeled products. The disclosed system may capture an image of the product when a scanner is reading the machine readable label (MRL) of a product, or immediately after the MRL reading has been obtained. Further, the disclosed system can determine a bounding box of the product in the image and a size corresponding to the bounding box. As used hereinafter, the size corresponding to the bounding box refers to the corresponding size comparable to the physical product in the physical world. If the size corresponding to the bounding box does not match the standard size associated with the MRL, the disclosed system may generate an alert for the potential mismatch between the MRL and the product in the image (hereinafter, referred to as "mismatch").

In various aspects, systems, methods, and computer-readable storage devices are provided to improve a computing device's ability to detect mislabeled products. One aspect of the technology described herein is to improve a computing device's ability to detect mislabeled products based on various measurements, such as size dissimilarity, visual dissimilarity, weight dissimilarity, etc. Another aspect of the technology described herein is to improve the computing device's ability for object detection in an image, e.g., by identifying a region of interest (ROI) that potentially contains the interested object. Yet another aspect of the technology described herein is to improve the computing device's ability to determine and manage the 2D size of a three-dimensional (3D) object captured in an image.

BRIEF DESCRIPTION OF THE DRAWING

The technology described herein is illustrated by way of example and not limited in the accompanying figures in which like reference numerals indicate similar elements and in which.

DETAILED DESCRIPTION

Figure 1:
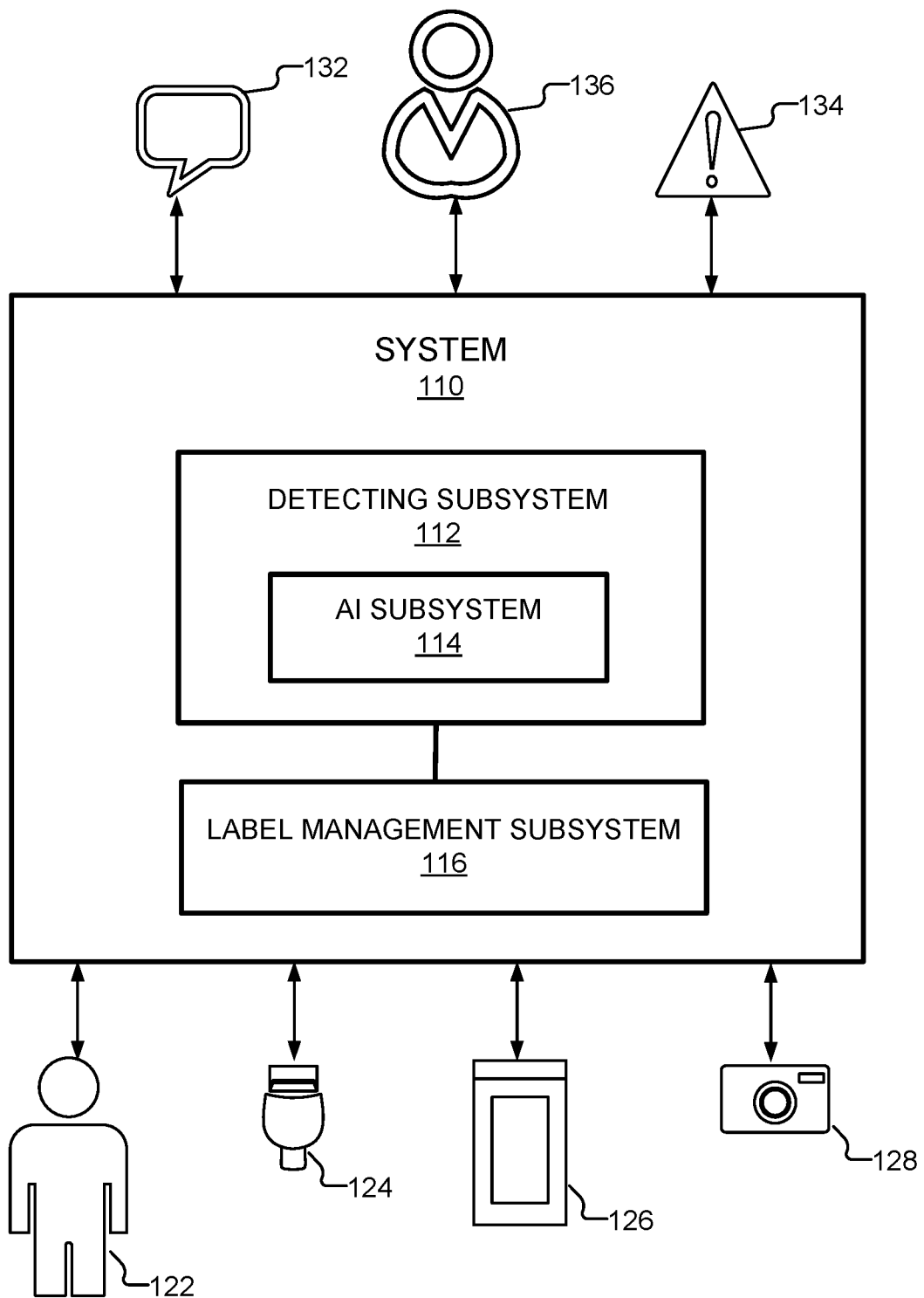
FIG. 1 is a block diagram illustrating an exemplary operating environment for implementing mislabeled product detection, in accordance with at least one aspect of the technology described herein.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally denotes that the succedent condition is used in performing the precedent action.

In our modern economy, most products are affixed with MRLs, such as UPC barcodes, QR codes, RFID tags, etc. Accordingly, these MRLs may be read by scanning devices for recording transactions at POS locations, for tracking inventory at warehouses, or facilitating transportation of goods in commerce.

An MRL may be provisioned by a manufacturer, e.g., a UPC label on a TV, or by a retailer, e.g., a UPC label for an apple in a supermarket. Sometimes, an MRL may be accidentally misplaced and affixed to an unintended product. Unfortunately, an MRL could also be affixed to a product due to a type of fraud, known as ticket switching. A lower-priced MRL is fraudulently affixed to a higher-priced product, so that the higher-priced item could be purchased for less. By way of example, a customer may remove the UPC label from an apple and affix the lower-priced label to a TV, and defraud the supermarket by checking out the TV in a self-checkout station using the lower-priced label for an apple. Electronic items or just about any more expensive items could be targets of ticket switching.

Ticket switching has caused shrinkage and erroneous inventory tracking for retailers. However, retailers lack practical and effective means to combat such fraud. In some jurisdictions, ticket switching may be prosecuted as a crime, such as shoplifting or fraud, if it is uncovered. However, to uncover this type of fraud is expensive. A conventional solution is to install surveillance cameras at the self-checkout area and hire security staff to watch the surveillance video during or after the checkout process, which is only effective if the watcher can recognize the product being sold. However, this conventional method seems to conflict with the economical motivation behind the concept of self-checkout-instead of labor cost reduction, now each self-checkout machine requires a member of the security staff. Resultantly, the conventional solution is often cost-prohibitive and ineffective.

In this disclosure, a practical technical solution is provided to detect mislabeled products in real time or near real time as well as retrospectively, so that the retailers can prevent shrinkage and correct erroneous information of their inventory due to ticket switching. As one example, retailers may use the disclosed technology for shrinkage prevention by detecting mismatches in real time and preventing the mismatched product from being sold. As another example, retailers may use the disclosed technology for inventory management, such as by retrospectively scanning store videos, synchronized in time domain with events of MRL readings, and rectifying their inventory information based on any detected mismatch events.

At a high level, technical solutions are provided to detect mislabeled products, which will be further discussed in connection with various figures, such as FIGS. 6-8. When the system receives a reading of an MRL, the system will capture an image of the product simultaneously. Using artificial intelligence, particularly a subsystem for object detection, the system can identify the product in the image and determine a bounding box that encloses the product. The size of the bounding box, i.e., the area within the bounding box in the image, can be converted to a corresponding size comparable to the physical product in the physical world. This corresponding size converted from the size of the bounding box is then compared with the standard size associated with the MRL. Other parameters, such as visual dissimilarity or weight dissimilarity, may also be measured.

Subsequently, the system can determine whether the MRL mismatches the product in the image, e.g., based on the size dissimilarity, the visual dissimilarity, the weight dissimilarity, etc.

Further, for real time applications, the system can capture the image in real time and generate an alert for the detected mismatch or otherwise prevent the ongoing error-prone transaction. For non-real time applications, the system may capture the image during a video playback based on the timestamp of the MRL reading. The system may further identify the nature of the product in the image, and correct the inventory information if necessary, which will be discussed in more detail in connection with FIGS. 1-2.

In some embodiments, the information associated with an MRL, such as the standard size, the standard visual features, the standard weight, etc., may be predetermined or dynamically retrieved when needed. By way of example, the dimensional data of a product (e.g., width, length, and height) may be obtained from the UPC database or its manufacturer. Subsequently, the standard size associated with the MRL, which refers to the area of the projection of the 3D product to a 2D plane, may be calculated from the dimensional data, which will be further discussed in connection with FIGS. 3-5.

In some embodiments, the images taken by the system may be used to determine or enrich the information associated with an MRL, such as the standard size, the standard visual features, the standard weight, etc. By way of example, given most MRLs are accurately affixed to the intended products, the system can learn the standard size associated with an MRL after a sufficient amount of training data, including the reading of the MRLs and the corresponding images, which will be further discussed in connection with FIGS. 1-2 and 5.

Advantageously, the disclosed system can detect mislabeled products. By using various dissimilarity measurements, such as size dissimilarity, visual dissimilarity, weight dissimilarity, etc., the system can more accurately detect mislabeled products and mitigate false positives. Further, the disclosed system can recognize the product in the image more efficiently to support real time applications, e.g., by first identifying an ROI that potentially contains the product, thus reducing the sample space for searching the product. Even further, the disclosed system can automatically learn the baseline of a product from MRL readings and their paired images, therefore bootstrap the process to gather the standard information associated with the MRL for the product.

Needless to say, retailers will benefit from this cost-effective technical solution for fraud prevention and accurate inventory tracking without hiring additional security staff. On the other hand, regular customers can continue to enjoy their shopping experience with the convenience of self-checkout.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing mislabeled product detection is shown. This operating environment is merely one example of a suitable computing environment and is not intended to suggest any limitation as to the scope of use or functionality of aspects of the technology described herein. Neither should this operating environment be interpreted as having any dependency or requirement relating to any one component nor any combination of components illustrated.

Turning now to FIG. 1, a block diagram is provided showing an operating environment in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

In addition to other components not shown in FIG. 1, this operating environment includes system 110 for detecting mislabeled products. System 110 interacts with various devices, such as scanner 124, scanner 126, and camera 128. Further, system 110 also communicates with various users, such as customer 122 or manager 136, e.g., via message 132 or alert 134. In this embodiment, system 110 comprises detecting subsystem 112 and label management subsystem 116. Detecting subsystem 112 further comprises artificial intelligence (AI) subsystem 114.

It should be understood that this operating environment shown in FIG. 1 is an example. Each of the system components shown in FIG. 1 may be implemented on any type of computing device, such as computing device 900 described in connection to FIG. 9, for example. Further, system 110 may communicate with various devices, or system components in system 110 may communicate with each other, via a network, which may include, without limitation, a local area network (LAN) and/or a wide area network (WAN). In exemplary implementations, WANs include the Internet and/or a cellular network, amongst any of a variety of possible public and/or private networks.

Figure 3:
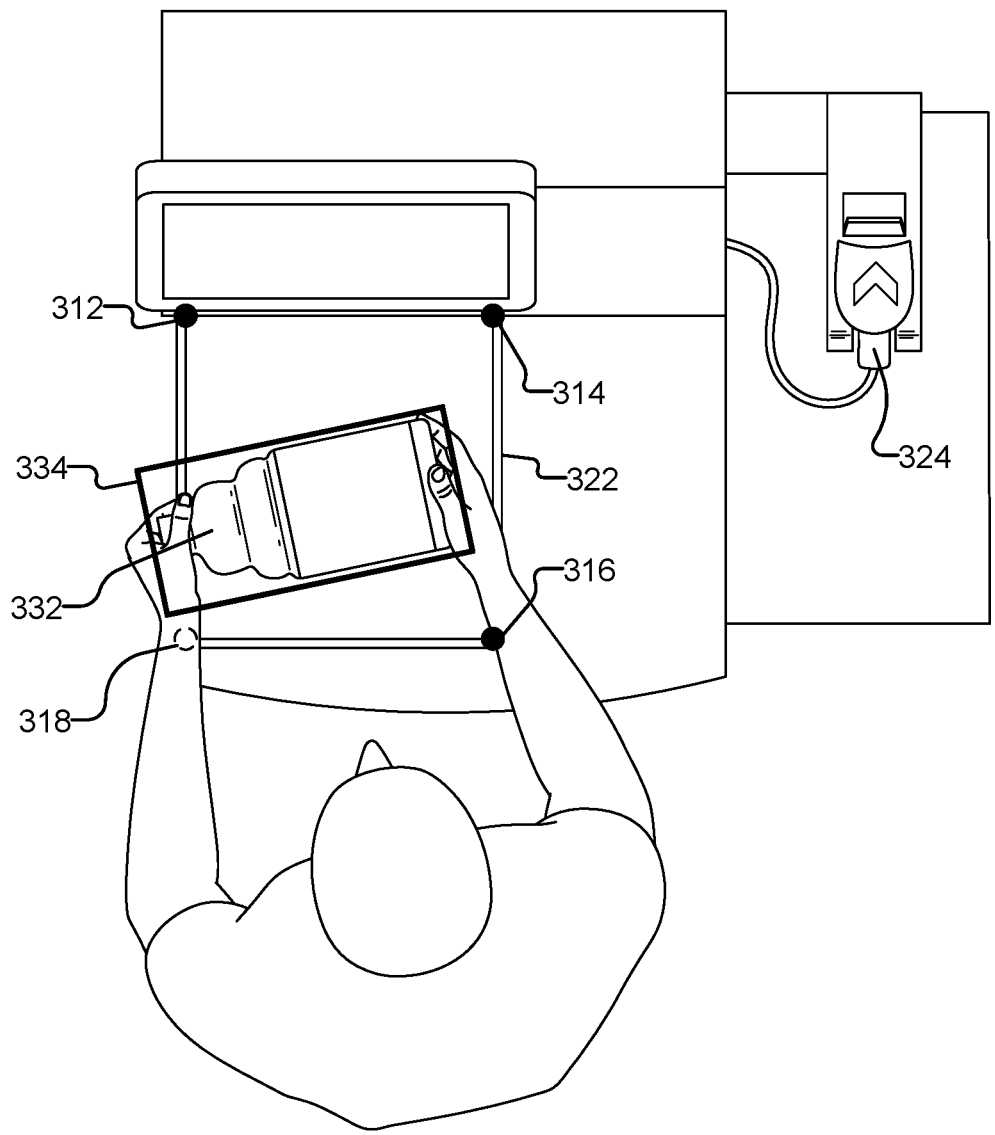
FIG. 3 is a schematic representation illustrating an exemplary bounding box of a product, in accordance with at least one aspect of the technology described herein.

Scanner 124 or scanner 126 is an electronic device, which scans MRLs at POS and provides information of their readings of MRLs to management to assist with transactions, stock control, inventory management, store performance, etc. In various embodiments, scanner 126, similar to scanner 322 in FIG. 3, is an in-counter scanner mounted into a countertop. Scanner 126 can read MRLs, such as barcodes or RFIDs. Further, scanner 126 is also equipped with an integrated scale to capture the weight of the product on the scanner. On the other hand, scanner 124 is a handheld device, similar to scanner 424 in FIG. 4, which is capable of reading MRLs and communicating the MRL data to system 110 via a cable or wirelessly.

Customer 122 can use scanner 124 or scanner 126 to check out items from a store. When system 110 receives the reading of the MRL of the product from scanner 124 or scanner 126, system 110 will activate camera 128 to capture the product in an image in real time. In some embodiments, camera 128 is a video camera. In this case, system 110 can extract a frame from the video footage corresponding to the time when the MRL was read by scanner 124 or scanner 126. In other non-real time user cases, system 110 may retroactively extract frames based on the timestamps for MRL readings. In some embodiments, the weight of the product on scanner 126 will also be measured and passed to system 110.

Upon receiving the MRL data and the image, system 110 can analyze the image and determine whether the MRL matches the product in the image. To do that, AI subsystem 114 is to perform object recognition on the image. In various embodiments, based on the source of the reading of the MRL, such as whether the reading is received from scanner 124 or scanner 126, a specific ROI in the image may be identified to most likely contain the interested product. Therefore, AI subsystem 114 can expedite the task to identify the product in the specific ROI instead of the whole image. Once the product is identified in the image, AI subsystem 114 may add a bounding box to enclose the product. This process of identifying the product and determining the bounding box may be performed together, and will be further discussed in connection with FIG. 2.

Figure 5:
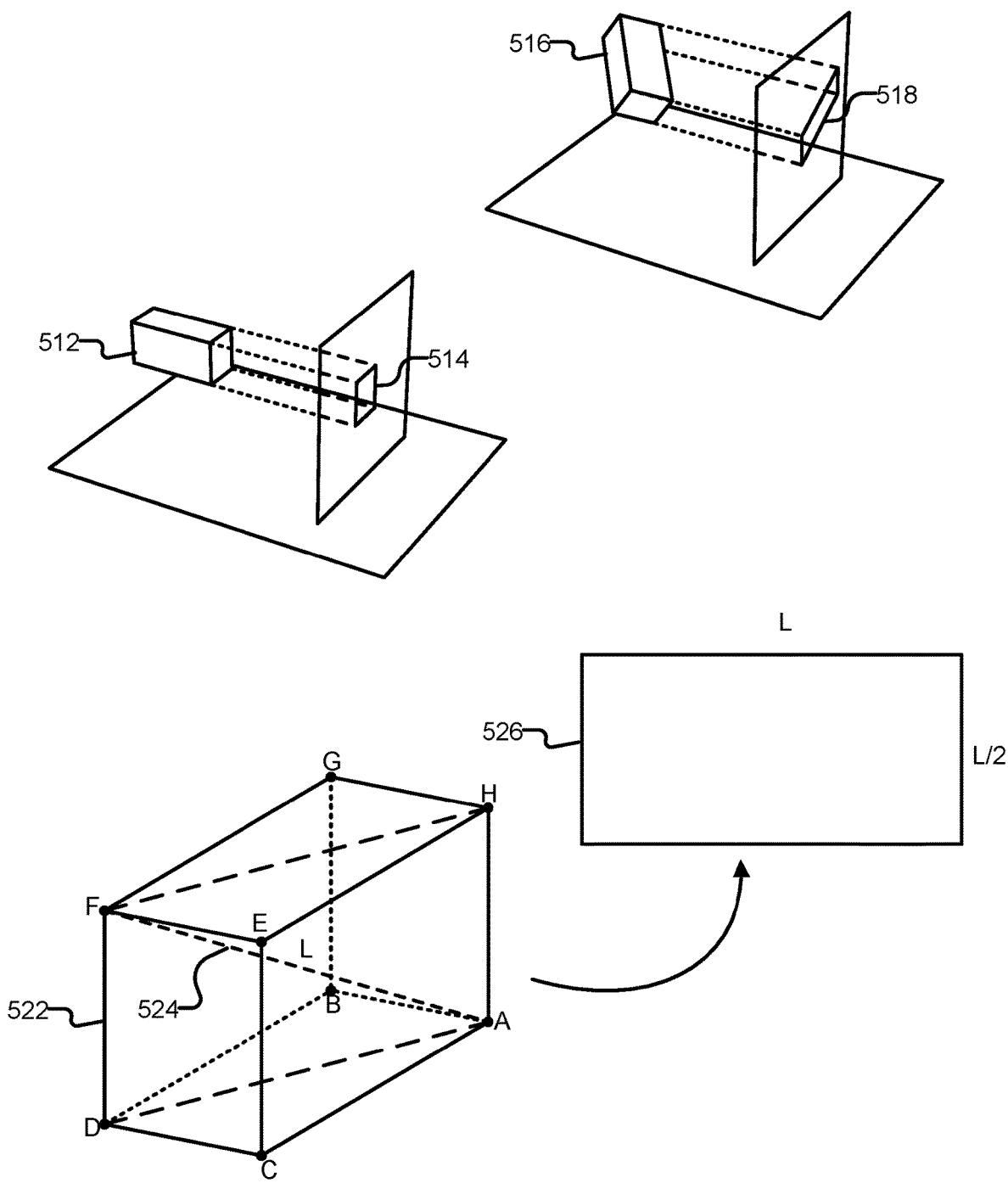
FIG. 5 is a schematic diagram illustrating a 2D area associated with a 3D object, in accordance with at least one aspect of the technology described herein.

Label management subsystem 116 manages information associated with MRLs. For example, label management subsystem 116 may retrieve UPC information of MRLs from a UPC database, such as information of country of registration, brand, model number, size, color, etc. The UPC database may include International Article Number (a.k.a. European Article Number or EAN). Further, label management subsystem 116 may gather specific product information, such as the length, width, height, weight, etc. of the product with or without the package of the product. Since a product may be repackaged for different seasons or events, such as in a holiday special package with different dimensional information, label management subsystem 116 may fork multiple entries for the same product, e.g., based on the time of year when the product is on sale. Further, the dimensional information, length, width, and height of the product may be converted into a standard size of the product, which refers to the area of a shape after projecting the 3D shape of the product into a 2D plane, such as shown in FIG. 5. Even further, one or more known images of the product, with or without the package, may be stored in label management subsystem 116. Additionally, specific product information, such as the standard size or weight, which will be referred to as the standard information of the product thereof, may be input or adjusted by manager 136 in the store.

Detecting subsystem 112 will analyze the image data or other sensory data (e.g., the weight) and determine whether the MRL mismatches the product in the image. Mismatches may be detected if the size corresponding to the bounding box mismatches the standard size associated with the MRL in label management subsystem 116. Further, mismatches may be detected if the visual features within the bounding box fail to match the standard image data of the product in label management subsystem 116. Further, mismatches may be detected if the weight of the product is significantly different from the standard weight associated with the MRL in label management subsystem 116. In some embodiments, additional information of the product (including its package) may be used to detect the mismatch, such as the material of the package (e.g., paper, poly, glass, metal, etc., detectable via sensors) or odors/flavors (detectable via sensors). For example, mismatches of cosmetics, facial, hair care, and beauty products may be detected based on their respective unique odors detected via an electronic nose (not shown in FIG. 1) integrated in a scanner. In some embodiments, the mismatch is detected based on one or more measurements, such as size dissimilarity, visual dissimilarity, weight dissimilarity, etc., which will be further discussed in connection with FIG. 8.

If a mismatch is detected, system 110 may temporally suspend the ongoing transaction and generate alert 134. Alert 134 may simply indicate a potential mismatch or reveal more specific information, such as the cause for the mismatch, such as due to size mismatch, weight mismatch, odor mismatch, visual feature mismatch, etc. Alert 134 may be shown to customer 122, so that customer 122 can rescan the product or seek help from manager 136. Alert 134 may be sent to manager 136, so that manager 136 can intervene to address the issue, such as help customer 122 verify the MRL or the product.

Further, system 110 can generate message 132 to other systems in the store. By way of example, in a non-real time application, message 132 may indicate to the inventory system in the store that product A has been purchased as product B, so that the inventory system can adjust accordingly, and the retailer now can have more accurate information of both product A and product B. In some embodiments, system 110 may capture customer 122 using camera 128 if a mismatch is detected. In this case, message 132 may include the image of customer 122, and message 132 may be sent to the security staff for evidence or further investigation. In other embodiments, message 132 may include other information generated by system 110 for different applications.

As can be contemplated by a person skilled in the art, different application-specific or domain-specific input/output devices or communication messages are likely required to solve application-specific or domain-specific problems. In various embodiments, different input/output devices may be added or removed from the exemplary operating environment depicted in FIG. 1. Similarly, different actors, besides customer 122 and manager 136, may interact with system 110. Further, system 110 may communicate with other systems to accomplish other tasks.

Figure 2:
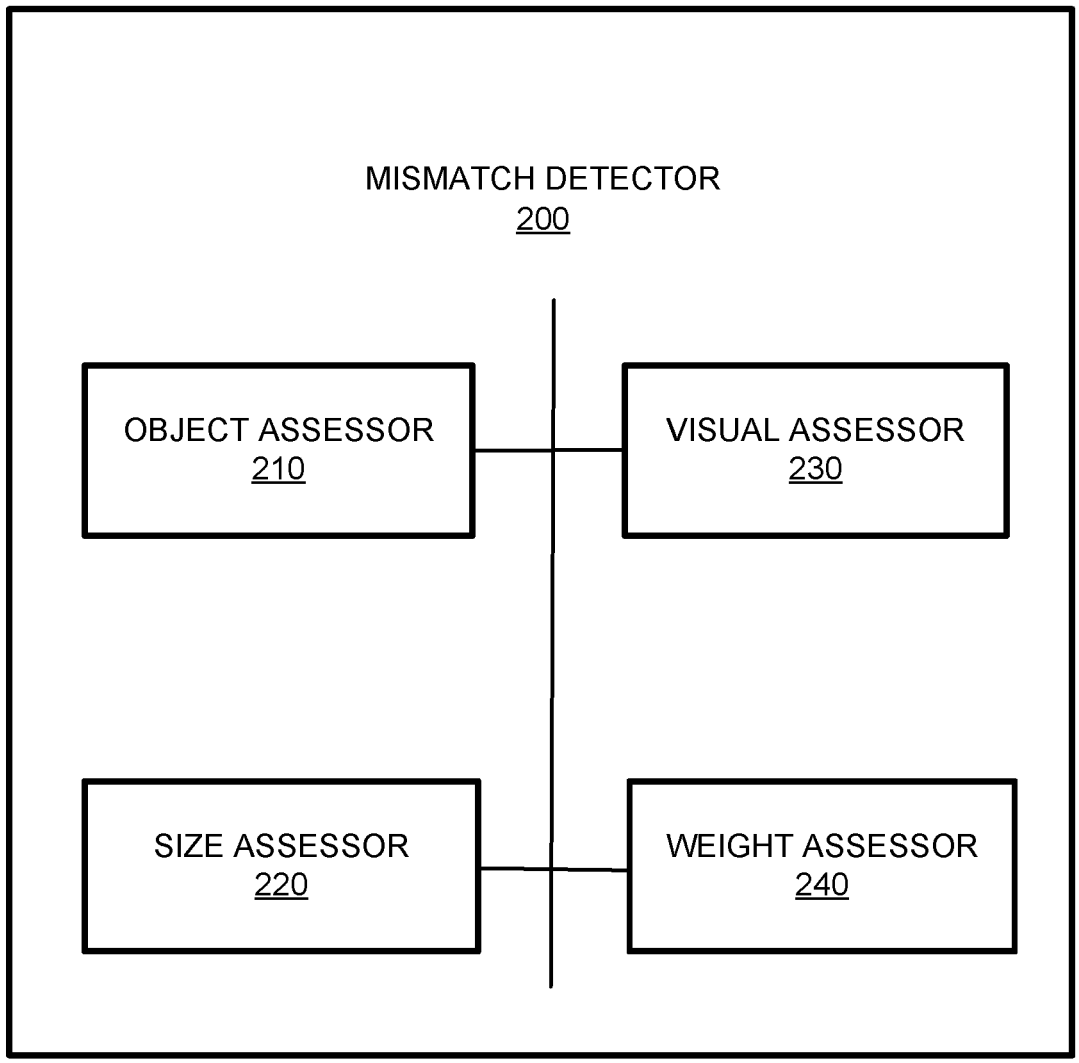
FIG. 2 is a block diagram illustrating an exemplary mismatch detector, in accordance with at least one aspect of the technology described herein.

Referring now to FIG. 2, a block diagram is provided showing aspects of an exemplary mismatch detector for implementing an embodiment of detecting subsystem 112 in FIG. 1, and designated generally as mismatch detector 200. It should be noted that mismatch detector 200 represents only exemplary computing system architecture.

Mismatch detector 200 is a mismatch detection system based on computer vision and AI technologies. In this embodiment, mismatch detector 200 includes object assessor 210, size assessor 220, visual assessor 230, and weight assessor 240, among other entities, which are not presently illustrated in FIG. 2.

In various embodiments, after mismatch detector 200 receives the MRL information and the image of the product, and optionally the weight or other information of the product, as discussed in connection with FIG. 1, based on computer vision and AI technologies, object assessor 210 is to identify the product in the image and determine a bounding box for the product; size assessor 220 is to compare a size dissimilarity between the bounding box and a standard size associated with the MRL; visual assessor 230 is to compare a visual dissimilarity between the content in the bounding box and the standard image data associated with the MRL; and weight assessor 240 is to compare a weight dissimilarity between the product and the standard weight associated with the MRL.

Mismatch detector 200 may detect a potential mismatch based on the size dissimilarity determined by size assessor 220. The standard size associated with an MRL may include a range of acceptable sizes, e.g., between a minimum size and a maximum size, which will be further discussed in connection with FIG. 5. In one embodiment, the size dissimilarity between the bounding box and a standard size associated with the MRL, as determined by size assessor 220, may be binary. For example, the size dissimilarity of 1 means the size corresponding to the bounding box in the physical world is either less than the minimum size or greater than the maximum size; and the size dissimilarity of 0 means otherwise. In one embodiment, the size dissimilarity may be a continuous variable that varies, for example, depending on the discrepancy between the bounding box and a standard size associated with the MRL, which will be further discussed in connection with FIG. 8.

Further, mismatch detector 200 may also detect a potential mismatch based on the visual dissimilarity determined by visual assessor 230. Similar to the size dissimilarity measurement, in one embodiment, the visual dissimilarity between the content in the bounding box and the standard image data associated with the MRL, as determined by visual assessor 230, may be binary. For example, visual assessor 230 extracts visual features from the content in the bounding box as well as the standard image data associated with the MRL based on deep metric learning, and compares their visual features. If their visual features fail to match, visual assessor 230 may assess their visual dissimilarity as 1; otherwise, 0. In one embodiment, visual features are vectors, and their comparison is to compare vectors in a high dimensional space. In one embodiment, the visual dissimilarity is compared on a high level based on high level visual features, e.g., categorical comparison. In this case, if the content in the bounding box and the standard image data associated with the MRL are in different categories, or if the two vectors representing them are pointed to different regions or directions, then the visual dissimilarity score will be 1, and mismatch detector 200 is likely to determine the case as a potential mismatch. In some embodiments, the visual dissimilarity score is a continuous variable, e.g., based on a distance measurement between the two vectors in their high dimensional space.

Further, mismatch detector 200 may also detect a potential mismatch based on the weight dissimilarity determined by weight assessor 220. Sometimes, the weight of a product is relatively a constant with marginal variations, e.g., due to packaging. Sometimes, the weight of a product varies significantly, such as between a personal size watermelon and a giant size watermelon. Accordingly, weight assessor 220 may customize methods for determining weight dissimilarity for different products. By way of example, for relatively constant weight, weight assessor 220 may allow relatively limited discrepancy between the measured product weight and the standard weight associated with the MRL before calling a mismatch. Conversely, for products with variable weights, the tolerance threshold may be set leniently.

Mismatch detector 200 may use the size dissimilarity, the visual dissimilarity, and the weight dissimilarity in a complementary fashion. For example, MRL information points to watermelon and the size corresponding to the bounding box of the product is within the normal range of sizes associated with watermelon, so there is no mismatch based on the size dissimilarity alone. However, weight assessor 220 may report that the weight of the product is greater than the maximum possible weight of a watermelon. In this case, mismatch detector 200 may still report a potential mismatch.

Further, mismatch detector 200 may be implemented using components such as hardware, software, firmware, a special-purpose device, or any combination thereof. Mismatch detector 200 may be integrated into a single device or it may be distributed over multiple devices. The various components of mismatch detector 200 may be centrally-located or distributed.

As mismatch detector 200 is merely serving as one example of system design, it is not intended to suggest any limitation as to the scope of use or functionality of aspects of the technology described herein. Neither should any component in mismatch detector 200 be interpreted as having any necessary dependency relating to another component as illustrated. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity.

Further, many of the entities in mismatch detector 200 described herein are functional entities that may be implemented as centralized or distributed components or in conjunction with other components, in any suitable combination, and in any suitable physical or virtual locations. Various functions described herein as being performed by an entity may be carried out by hardware, firmware, and/or software. For instance, some functions may be carried out by a processor executing instructions stored in memory, and some functions may be carried out by a specially designed firmware or hardware.

FIG. 3 is a schematic representation illustrating an exemplary bounding box of a product, with which some embodiments of the present disclosure may be employed. In some embodiments, FIG. 3 depicts a self-checkout station used by a customer. In alternative embodiments, FIG. 3 also depicts a checkout station used by a cashier. The system and process as descried herein can be applied to both kinds of checkout user cases. Self-checkout is used hereinafter as an example.

There are two scanners in this self-checkout station. Scanner 324 is a handheld scanner, which is parked at its slot and in an inactive status. Scanner 322 is an in-counter scanner mounted into a countertop with an integrated scale. These scanners may be commonly found at grocery stores or supermarkets. With the mobility, scanner 324 can be used to scan bulky or heavy items on the cart or specifically to aim directly at an MRL for accuracy. With a large scanning area, scanner 322 can often quickly scan items without needing to orient or aim directly at MRLs. In this embodiment, four reference points (i.e., point 312, point 314, point 316, and point 318) are marked at the four corners of scanner 322.

When the customer is scanning product 332 using scanner 324, a camera mounted above scanner 324 captures the image of product 332 as the system is configured to actuate the camera whenever scanner 322 or scanner 324 reads an MRL. In one embodiment, the system causes the camera to take multiple images before, during, or after the scanning process, and the image taken immediately after product 332 has been scanned may be selected to pair with the MRL reading. Further, scanner 322 may output the weight of product 332 to, e.g., weight assessor 240 in FIG. 2, if product 332 was also weighted by the scale of scanner 322. Further, object assessor 210 of FIG. 2 may determine bounding box 334 after analyzing the image.

Back to object assessor 210 in FIG. 2, it may use any object detection models to detect objects in the image, such as R-CNN, Fast R-CNN, Faster R-CNN, Light-head R-CNN, YOLO, YOLOv2, YOLOv3, etc., wherein CNN refers to convolutional neural network, and you only look once (YOLO) is an object detection model. Further, based on the object detection model, a bounding box around the object of interest can also be determined. However, in some embodiments, instead of feeding the whole image into an object detection model, only a region of interest (ROI) is selected from the image and fetched to the object detection model. The ROI is the area that most likely contains the product being scanned. Therefore, the ROI may be determined based on the source of the reading of the MRL, such as whether the reading is received from scanner 322 in FIG. 3 or scanner 424 in FIG. 4. Further, as customers commonly only scan one product at a time, the ROI thus often contains only one product.

In this embodiment, the four reference points, i.e., point 312, point 314, point 316, and point 318, naturally define an ROI because the rectangle area defined by the four reference points is the scanning area, which will likely contain the product being scanned. Therefore, in some embodiments, if scanner 322 is determined as the source device that read the MRL, the area around scanner 322 will be selected as the ROI to be processed in the object detection model. Alternatively, scanner 322 can be used as a guide to identify the ROI. In one embodiment, since the camera is stationary in relationship to scanner 322, in other words, the spatial conditions for constructing the image is known; therefore, this ROI can be predetermined in the image. In one embodiment, this ROI may be dynamically determined after identifying two or more reference points in the images. The specific reference points may be determined based on key point prediction models, or predetermined in the image if the camera is stationary.

Object detection models based on CNN generally involve expensive operations. For example, R-CNN uses selective search to generate region proposals, i.e., bounding boxes for image classification. Each bounding box may be classified via CNN. Further, each bounding box can be refined using regression, or further fine-tuned by another bounding box regressor. With Fast R-CNN, instead of the region proposals to the CNN, the input image is fed to the CNN to generate a convolutional feature map, where region proposals may be identified. After further processing, the class of a proposed region may be predicted, and the offset values for the bounding box may be determined. Fast R-CNN is faster than R-CNN because the convolution operation is only run once per image. Both of the above methods, R-CNN and Fast R-CNN, use selective search to find out the region proposals. Selective search is a slow and time-consuming process affecting the performance of the network. Faster R-CNN is similar to Fast R-CNN, in which the image is provided as an input to a convolutional network which provides a convolutional feature map. However, Faster R-CNN departs from the time-consuming process of selective search to identify the region proposals, and instead, Faster R-CNN uses a separate network to predict the region proposals.

By feeding only the ROI, i.e., less raw data than the whole image, to the object detection model, the complexity of the input to the object detection model is significantly reduced. Further, the ROI usually contains a single object only, i.e., the product being scanned, so that the object detection model may be further optimized or simplified. In this way, object assessor 210 can detect the product or the bounding box of the product in real time or near real time with significantly reduced computational time and increased accuracy.

Back to size assessor 220 in FIG. 2, size assessor 220 is to determine the size corresponding to bounding box 334. In some embodiments, the image is taken by a stationary camera with a known resolution. Thus, the whole image is fixed to stationary boundaries. For example, an 8.0 megapixel image has the resolution of 3264×2448. If the length of the image, represented by the 3264 pixels is always corresponding to a fixed physical length, e.g., 32640 millimeters, then every pixel in the image can represent 10 millimeters. Accordingly, the size corresponding to bounding box 334 can be easily computed based on, e.g., the ratio of the pixels inside the bounding box in relation to the total pixels in the image. In some embodiments, the distance between two reference points, or a size of a reference object, which is known information, can serve just like a map scale and be used to determine the size of a bounding box in the image. For example, the size corresponding to bounding box 334 may be determined based on the distance between two reference points, such as point 312 and point 314, which is a known measurement.

The size information of bounding box 334 may be compared with the standard size associated with the MRL, as disclosed previously, e.g., to compute a size dissimilarity score. In some embodiments, the size information of bounding box 334 may also be used to adjust the standard size associated with the MRL. In some embodiments, the size information of bounding box 334 may even be used to create a new standard size to be registered with the MRL.

Because label management subsystem 116 of FIG. 1 may have incomplete or inaccurate data on some MRLs, system 110 may improve its knowledge of MRLs by learning their associated attributes, e.g., the standard size over time based on repeated measurements of bounding box 334. In the absence of ticket switching, the MRL on a product typically matches the product. Therefore, the standard size that should be associated with the MRL may be safely inferred from the measured size of bounding box 334, given sufficient numbers of measurements. Other attributes, such as visual feature or weight, may be learned in the same manner.

Specifically, the area of bounding box 334, as discussed in connection with FIG. 5, may change depending on the position of the product. However, after running sufficient experiments, the distribution of the size variable may be obtained. In this case, the standard size may be determined based on the distribution of the size variable, representing the size corresponding to the bounding box. As one example, samples that lie within one, two, or three standard deviations of the mean may be used to determine the standard size. As another example, the outliers may be discarded, and the minimum size, the maximum size, the mean size, the average size, etc. may be determined based on the remaining samples. Other means based on the distribution of the size variable may also be used to determine the standard size.

Figure 4:
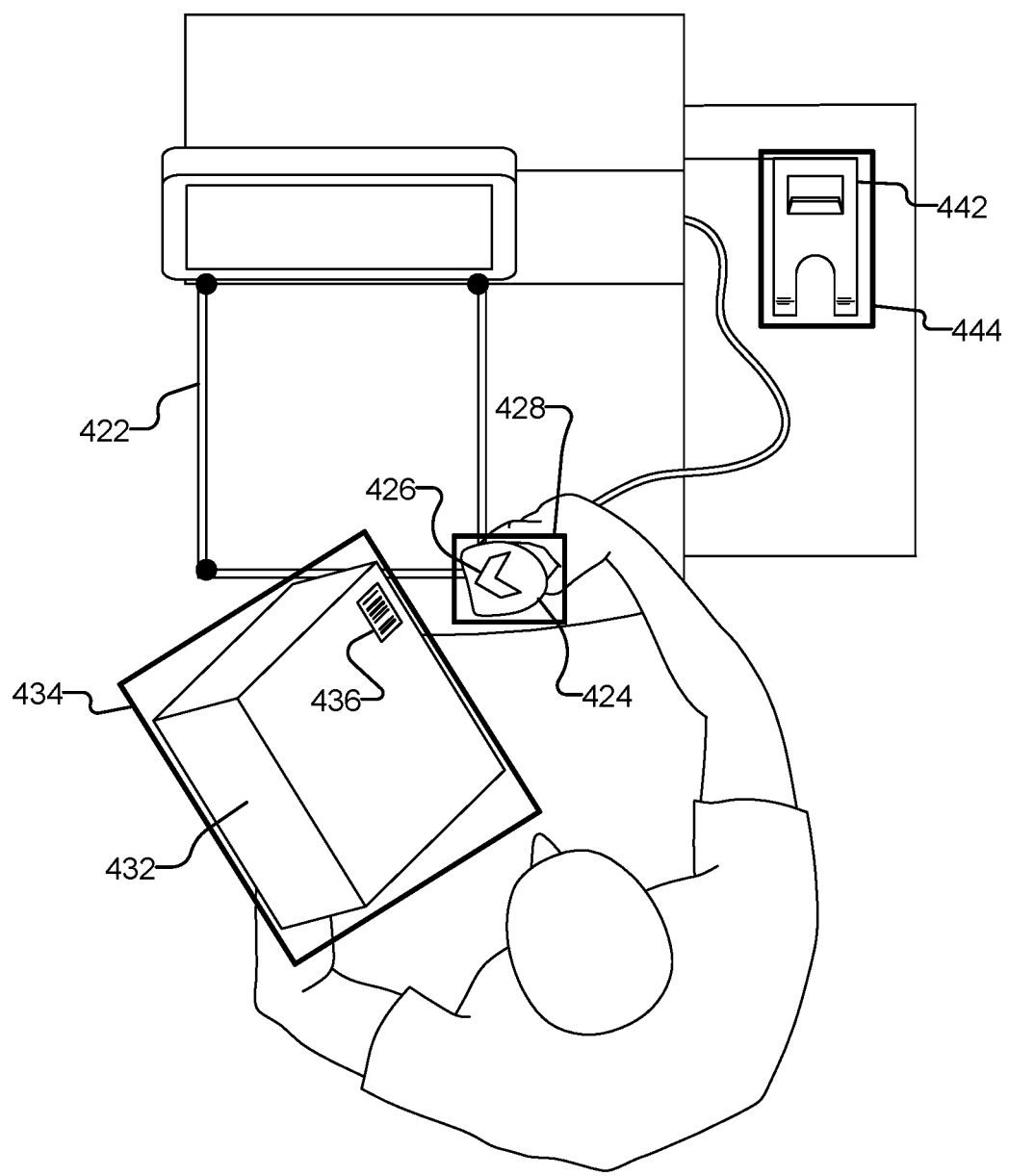
FIG. 4 is a schematic representation illustrating an exemplary bounding box of another product, in accordance with at least one aspect of the technology described herein.

Similar to FIG. 3, FIG. 4 is a schematic representation illustrating an exemplary bounding box of another product. In this case, the customer holds product 432, and uses scanner 424 to read MRL 436. Object assessor 210 may similarly determine bounding box 434 for product 432. To do that, object assessor 210 is first to detect whether scanner 424 has been activated or otherwise been placed in an active scan mode. In some embodiments, object assessor 210 can detect that scanner 424 has entered an active scan mode based on a triggering event, such as a push of a physical button associated with scanner 424, or by an electrical or electromagnetic event, which is triggered when scanner 424 has separated from holder 442. In some embodiments, object assessor 210 may detect that scanner 424 has entered an active scan mode using visual recognition technologies. By way of example, the object detection models, as previously discussed in connection with FIG. 2, can detect scanner 424 and holder 442 as different objects in FIG. 4, e.g., enclosed by bounding box 428 and bounding box 444 respectively. If scanner 424 is away from holder 442, which represents an inactive position for scanner 424, object assessor 210 may conclude that scanner 424 is in active use; otherwise, scanner 422 may be in active use instead.

In some embodiments, to identify product 432, object assessor 210 may identify the location of scanner 424 first. Scanner 424 may be detected as an object via object detection models as disclosed previously. Scanner 424 may also be identified based on marking 426, which is a special symbol with a unique color or shape. Subsequently, the location of the product that has been scanned may be estimated to be around scanner 424 when scanner 424 is the source device that generated the reading of the MRL. By the same token, the ROI may be proposed as the area around scanner 424. Further, in some embodiments, marking 426 or scanner 424 can indicate the location of product 432. In an example, marking 426 may be made in an arrow shape, which is consistent to the direction aimed by scanner 424. In another example, scanner 424 may emit a directional light, e.g., a directional beam of laser light, to MRL 436. Therefore, in FIG. 3 or FIG. 4, the bounding box of the product may be determined based on the general location of the product in the image and a neural network based object detection model.

FIG. 5 is a schematic diagram illustrating a 2D area associated with a 3D object. A real world product usually has a 3D shape. However, the product in an image is represented as a 2D object. Therefore, the standard size associated with an MRL usually refers to the projected area of the 3D product on a 2D plane. Depending on the spatial position of the product, its projection on a 2D plane may change. For example, product 512 and product 516 have the same 3D parameters. However, area 514 that projected from product 512 has a much smaller size compared to area 518 that projected from product 516, due to their respective spatial positions.

The size of such projection of a product will have a minimum value and a maximum value. In some embodiments, the absolute minimum value and maximum value may be determined from the 3D parameters of the product and used as the standard size to be registered with the MRL of the product. In some embodiments, reasonable estimates of the minimum value and maximum value may be used, and further, a tolerance coefficient may be used to provide some flexibility and customization for mislabeled production detection.

In one embodiment, diagonal 524, with length L, is the longest internal diagonal of bounding box 522 of a product. Bounding box 526 may be constructed based on the actual length, width, and height of the product. The minimum area, or the minimum 2D bounding box size, may be set as the smallest side of bounding box 522, multiplied to a tolerance coefficient, which is to regulate the tolerance level for the minimum 2D bounding box size. The maximum area, or the maximum 2D bounding box size, may be set to be $c*L*L/2$, where c is a tolerance coefficient for regulating the tolerance level for the maximum 2D bounding box size, and L is the length of the longest internal diagonal of bounding box 522. The tolerance coefficient may be adjusted up or down to accomplish specific tasks by regulating the tolerance range, e.g., when computing the size dissimilarity to detect mislabeled products.

Figure 6:
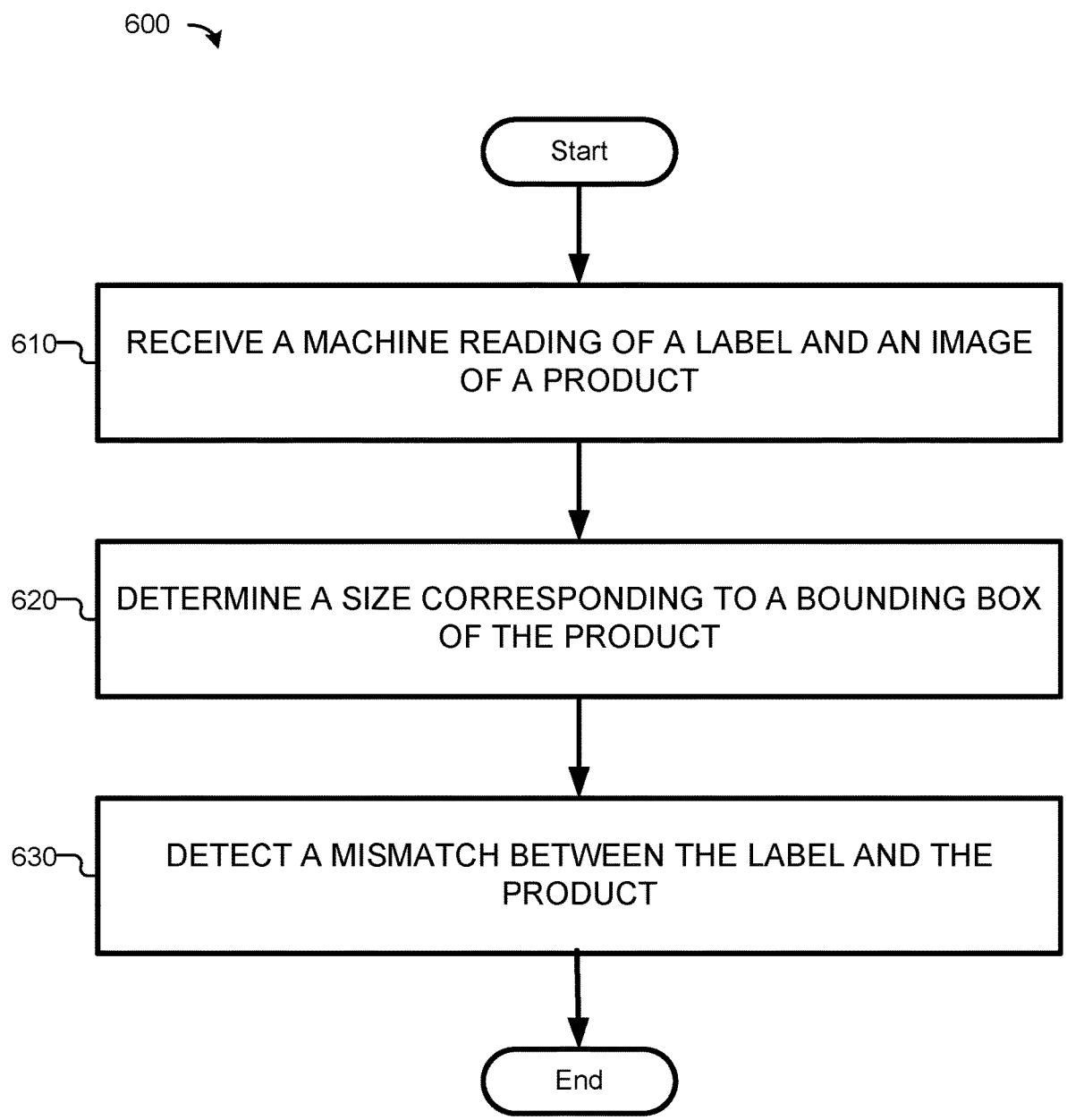
FIG. 6 is a flow diagram illustrating an exemplary process of detecting mislabeled products, in accordance with at least one aspect of the technology described herein.

Referring now to FIG. 6, a flow diagram is provided that illustrates an exemplary process of detecting mislabeled products. Each block of process 600, and other processes described herein, comprises a computing process that may be performed using any combination of hardware, firmware, and/or software. For instance, various functions may be carried out by a processor executing instructions stored in memory. The process may also be embodied as computer-usable instructions stored on computer storage media or device. The process may be provided by an application, a service, or in combination thereof.

At block 610, a machine reading of a label and an image of a product may be received, e.g., by system 110 of FIG. 1 or mismatch detector 200 of FIG. 2. In some embodiments, the machine reading of the label and the image of the product may be two synchronous events. For example, in response to receiving the machine reading of the label, system 110 may actuate camera 128 to capture the image of the product in a top-down view, such as when camera 128 is mounted above the product. In some embodiments, the machine reading of the label and the image of the product may be two asynchronous events. For example, the image of the product may be extracted from a video later based on the time of the machine reading of the label.

At block 620, the size corresponding to the bounding box of the product may be determined, e.g., by size assessor 220 of FIG. 2. This may be achieved in two steps, with the first step to determine the bounding box of the product and the second step to determine the size corresponding to the bounding box. As disclosed previously, the bounding box of the product may be determined based on an object detection model. The size corresponding to the bounding box may be determined based on the pixels in the bounding box if the relationship between a pixel and its corresponding size in the physical world is known. Further, the size corresponding to the bounding box may be determined based on a known reference in the image with a known physical size.

At block 630, a mismatch between the label and the product may be detected, e.g., by mismatch detector 200 of FIG. 2. In one embodiment, mismatch detector 200 is to detect a mismatch between the label and the product based at least in part on a comparison between the size corresponding to the bounding box and a standard size associated with the label. This process at block 630 is further discussed in connection with block 840 in FIG. 8.

Figure 7:
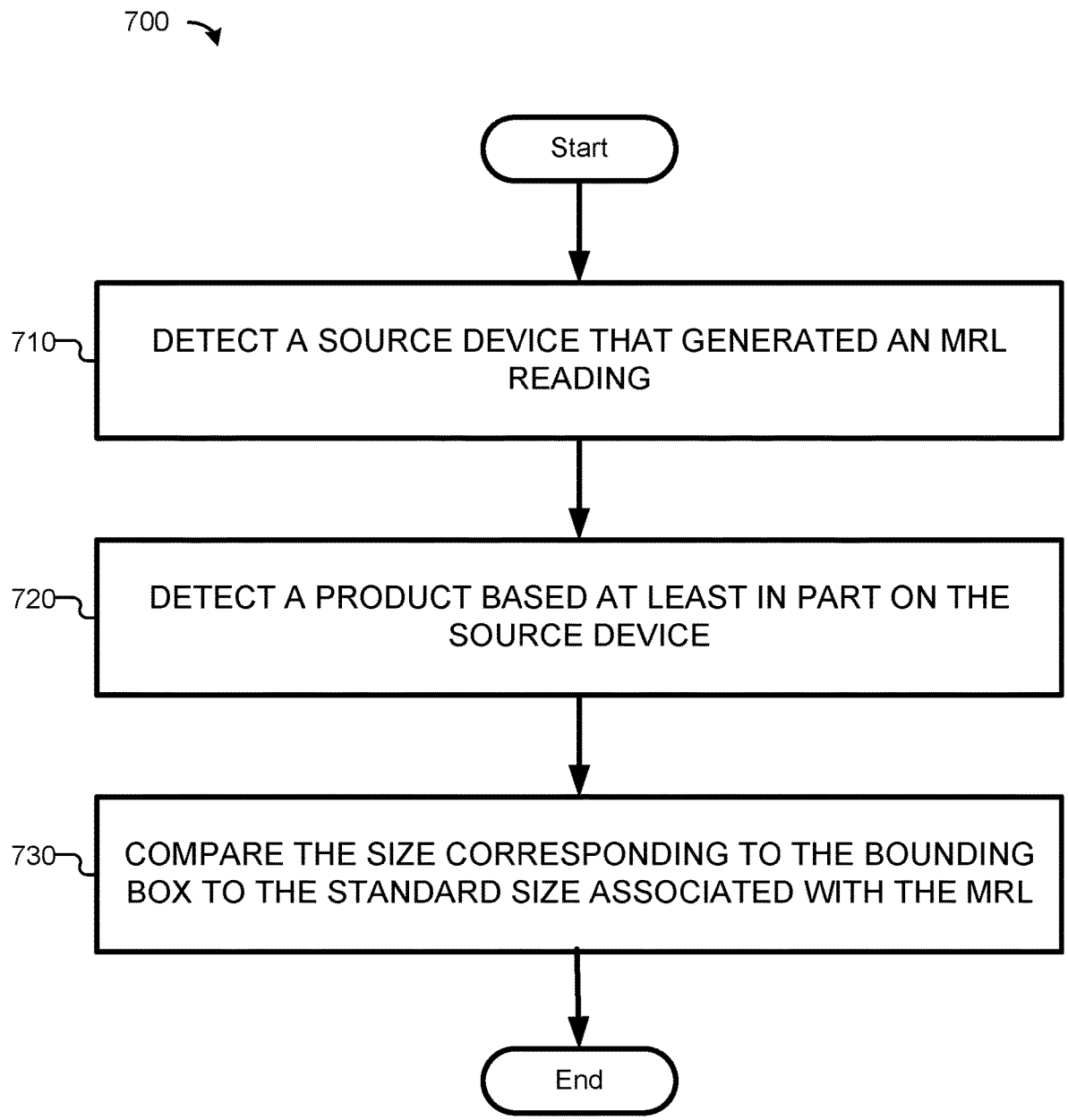
FIG. 7 is a flow diagram illustrating an exemplary process of comparing size dissimilarity, in accordance with at least one aspect of the technology described herein.

Turning now to FIG. 7, a flow diagram is provided to illustrate an exemplary process of comparing size dissimilarity. Each block of process 700, and other processes described herein, comprises a computing process that may be performed using any combination of hardware, firmware, and/or software. For instance, various functions may be carried out by a processor executing instructions stored in memory. The processes may also be embodied as computer-usable instructions stored on computer storage media or devices. The process may be provided by an application, a service, or in combination thereof. In various embodiments, process 700 may be performed in relation to block 620 of FIG. 6.

At block 710, a source device that generated an MRL reading may be detected, e.g., by system 110 of FIG. 1 or mismatch detector 200 of FIG. 2. For example, scanners are connected to system 110 via different I/O ports or networking interfaces. Therefore, system 110 may detect the source device based on the specific port or networking interface. Alternatively, the MRL reading itself may carry the identification information of the source device.

In some embodiments, a camera may cover multiple checkout stations. If there is only one MRL reading, the source device that generated the MRL reading may be identified. Further, the ROI in the image may be determined accordingly. However, if there are multiple simultaneous MRL readings, respective source devices that generated these MRL readings can also be identified. Each MRL reading may be paired with a corresponding source device as well as a corresponding ROI extracted from the image.

At block 720, a product may be detected based at least in part on the source device, e.g., by object assessor 210 of FIG. 2. In some embodiments, object assessor 210 may identify the product in the image based at least in part on a source device that generated the machine reading of the label. As disclosed previously, the product is usually in the vicinity of the source device that generated the machine reading of the label. Therefore, the source device is a good indication of the ROI that contains the product in the image. For example, if an in-counter scanner is used to generate the machine reading of the label, the product is likely placed above the in-counter scanner. Conversely, if a handheld scanner is activated to scan a product, the handheld scanner is likely facing toward the product. In one embodiment, a virtual line may be extended from the handheld scanner in its forward direction to identify the product being scanned. Subsequently, a bounding box of the product in the image may be determined based at least in part on a convolutional neural network based object detection model.

At block 730, the size corresponding to the bounding box of the product may be compared to the standard size associated with the MRL, e.g., by size assessor 220 of FIG. 2. As disclosed previously, the size of the bounding box of the product in the image may be converted to a corresponding size comparable to the physical product in the physical world. The standard size associated with the MRL may be in a range with a minimum value and a maximum value. It is a potential mismatch if the size corresponding to the bounding box of the product in the image does not match the standard size associated with the MRL. This process at block 730 is further discussed in more detail in connection with FIG. 8.

Figure 8:
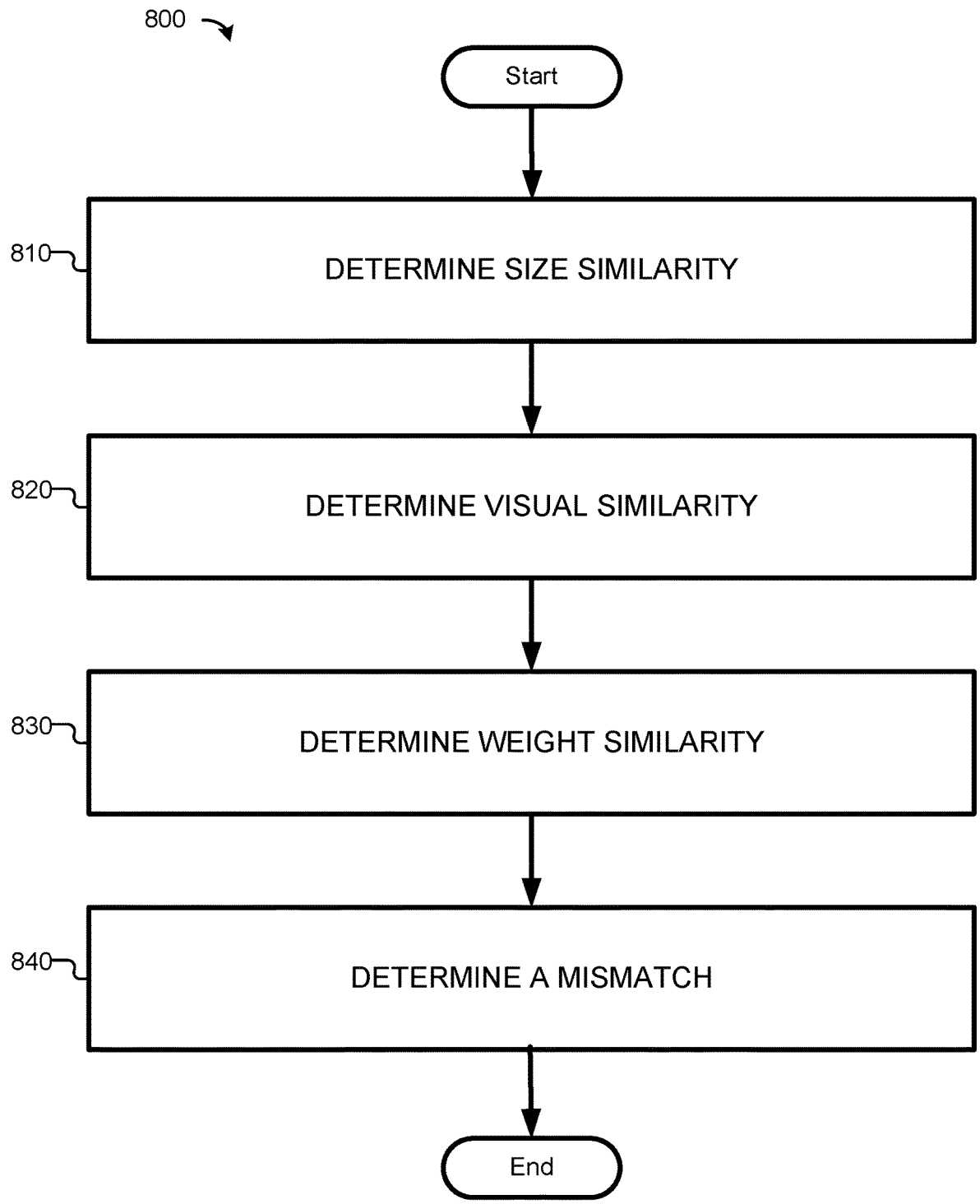
FIG. 8 is a flow diagram illustrating an exemplary process of determining a mismatch from various dissimilarity measurements, in accordance with at least one aspect of the technology described herein.

Referring now to FIG. 8, a flow diagram is provided to illustrate an exemplary process 800 of determining a mismatch from various comparisons. At block 810, the size dissimilarity may be determined, e.g., by size assessor 220 of FIG. 2. In some embodiments, size assessor 220 is to output a binary size dissimilarity score of either 0 or 1, e.g., to indicate whether the measured size matches the standard size.

In some embodiments, size assessor 220 is to output a continuous size dissimilarity score between 0 and 1, e.g., to indicate the relative difference between the measured size and the standard size. In an example, the standard size associated with the label comprises a minimum size (Smin) and a maximum size (Smax). Further, a size corresponding to the bounding box is determined to be S. The size dissimilarity may be determined based on Eq.1. In others embodiments, different equations may be used to derive the size dissimilarity.

$$\text{Size Dissimilarity} = \begin{cases} 0; & \text{if } S\text{min} \leq S \leq S\text{max} \\ \frac{S - S\text{max}}{S}; & \text{if } S > S\text{max} \\ \frac{S\text{min} - S}{S\text{min}}; & \text{if } S < S\text{min} \end{cases} \quad (\text{Eq. 1})$$

At block 820, the visual dissimilarity may be determined, e.g., by visual assessor 230 of FIG. 2. In some embodiments, visual assessor 230 is to output a binary visual dissimilarity score of either 0 or 1, e.g., to indicate a categorical match or mismatch of visual features. In some embodiments, visual assessor 230 is to output a continuous visual dissimilarity score between 0 and 1, e.g., to indicate the relative difference between two groups of visual features. For example, a CNN may output the probability of similarity after comparing their visual features. Accordingly, the visual dissimilarity score may be simply derived from the probability of similarity.

At block 830, the weight dissimilarity may be determined, e.g., by weight assessor 240 of FIG. 2. In some embodiments, weight assessor 240 is to output a binary weight dissimilarity score of either 0 or 1, e.g., to indicate whether the measured weight matches the standard weight. In some embodiments, weight assessor 240 is to output a continuous weight dissimilarity score between 0 and 1, e.g., to indicate the relative difference between the measured weight and the standard weight. The weight dissimilarity may be determined based on Eq.2, where AW represents the measured weight of the product, and the standard weight associated with the label is SW. In others embodiments, different equations may be used to derive the weight dissimilarity.

$$\text{Weight Dissimilarity} = \frac{|MW - SW|}{\max[MW, SW]} \quad \text{(Eq. 2)}$$

At block 840, a mismatch between the MRL and the product in the image may be determined, e.g., by mismatch detector 200 of FIG. 2. A mismatch may be determined based at least in part on a dissimilarity measurement between content within the bounding box of the product and known image data associated with the MRL, a dissimilarity measurement between a weight of the product and a known weight associated with the MRL, or a dissimilarity measurement between the size corresponding to the bounding box of the product in the image and the standard size associated with the MRL.

Based on the specific user case, different dissimilarity measurements may carry different weights for detecting mislabeled products. As one example, weight measurement may be unavailable, e.g., when customers do not put the product on the scale during the scanning process. As another example, weight measurement may be unreliable, e.g., when customers partially hold the product. As yet another example, the visual features of a product may be distorted when the product is partially covered by the customer. Therefore, when a mismatch is determined based on multiple dissimilarity measurements, different weights may be assigned to different dissimilarity measurements, e.g., as shown in Eq.3 in some embodiments. In Eq.3, the mismatch score (MS) between the label and the product is determined based at least in part on a first weight (w1) assigned to the size dissimilarity (S), a second weight (w2) assigned to the visual dissimilarity (V), and a third weight (w3) assigned to the weight dissimilarity (W). Respective weights may be determined based on the specific application.

$$MS = w1 \cdot S + w2 \cdot V + w3 \cdot W \quad \text{(Eq.3)}$$

In one embodiment, each dissimilarity measurement of S, V, and W is represent by 0 or 1, of which 0 represents match, while 1 represents mismatch. In another embodiment, S, V, or W may take continuous values between 0 and 1, as disclosed previously. If MS is 0, it is a perfect match. If MS is the same as the sum of all the weights (i.e., w1+w2+w3), it is a complete mismatch. Anything in between means at least one dissimilarity measurement revealed a partial mismatch, and the system may act accordingly based on the actual value of the mismatch score.

Accordingly, we have described various aspects of the technology for detecting mislabeled products. It is understood that various features, sub-combinations, and modifications of the embodiments described herein are of utility and may be employed in other embodiments without reference to other features or sub-combinations. Moreover, the order and sequences of steps shown in the above example processes are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 9:
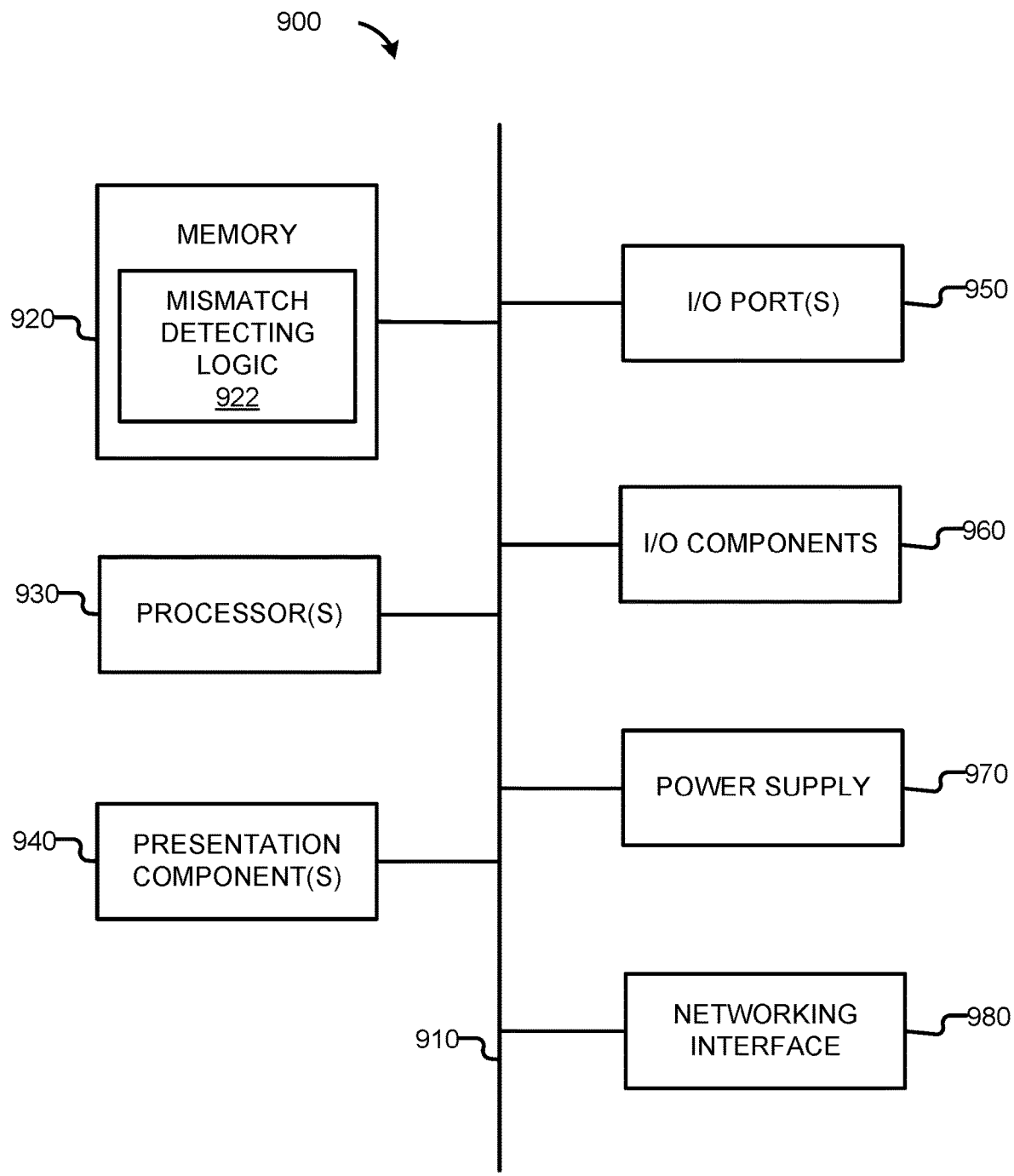
FIG. 9 is a block diagram of an exemplary computing environment suitable for use in implementing various aspects of the technology described herein.

Referring to the drawings in general, and initially to FIG. 9 in particular, an exemplary operating environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 9, computing device 900 includes a bus 910 that directly or indirectly couples the following devices: memory 920, processors 930, presentation components 940, input/output (I/O) ports 950, I/O components 960, and an illustrative power supply 970. Bus 910 may include an address bus, data bus, or a combination thereof. Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with different aspects of the technology described herein. Distinction is not made between such categories as "workstation," "server," "laptop," "handheld device," etc., as all are contemplated within the scope of FIG. 9 and refers to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 920 includes computer storage media in the form of volatile and/or nonvolatile memory. The memory 920 may be removable, non-removable, or a combination thereof. Exemplary memory includes solid-state memory, hard drives, optical-disc drives, etc. Computing device 900 includes processors 930 that read data from various entities such as bus 910, memory 920, or I/O components 960. Presentation component(s) 940 present data indications to a user or other device. Exemplary presentation components 940 include a display device, speaker, printing component, vibrating component, etc. I/O ports 950 allow computing device 900 to be logically coupled to other devices, including I/O components 960, some of which may be built in.

In various embodiments, memory 920 includes, in particular, temporal and persistent copies of mismatch detecting logic 922. Mismatch detecting logic 922 includes instructions that, when executed by processors 930, result in computing device 900 performing impersonation detection functions, such as, but not limited to, process 600, 700, and 800. In various embodiments, mismatch detecting logic 922 includes instructions that, when executed by processor(s) 930, result in computing device 900 performing various functions associated with, but not limited to, detecting subsystem 112, AI subsystem 114, or label management system 116 in connection with FIG. 1; or object assessor 210, size assessor 220, visual assessor 230, or weight assessor 240 in connection with FIG. 2.

In some embodiments, processors 930 may be packaged together with mismatch detecting logic 922. In some embodiments, processors 930 may be packaged together with mismatch detecting logic 922 to form a System in Package (SiP). In some embodiments, processors 930 can be integrated on the same die with mismatch detecting logic 922. In some embodiments, processors 930 can be integrated on the same die with mismatch detecting logic 922 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input.

The connection between the pen digitizer and processor(s) 930 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 900 may include networking interface 980. The networking interface 980 includes a network interface controller (NIC) that transmits and receives data. The networking interface 980 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 980 may include a wireless terminal adapted to receive communications and media over various wireless networks. Computing device 900 may communicate with other devices via the networking interface 980 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. An apparatus to detect mislabeled products, the apparatus comprising a memory having computer programs stored thereon a processor configured to perform, when executing the computer programs, operations comprising:
synchronizing a first action of generating a machine reading of a label of a product and a second action of capturing an image of the product;
determining an area corresponding to a 2D bounding box of the product in the image, wherein the 2D bounding box encloses the product in the image; and
detecting a mismatch between the label and the product in response to the area corresponding to the 2D bounding box being less than a minimum or greater than a maximum of a standard size of a standard product associated with the label, wherein the minimum and the maximum of the standard size of the standard product associated with the label are determined based on a projection of the standard product on a 2D plane.

2. The apparatus of claim 1, the operations further comprising:
determining a first location of the product in the image in response to a first source device generating the machine reading of the label, and
determining a second location of the product in the image in response to a second source device generating the machine reading of the label.

3. The apparatus of claim 2, the operations further comprising:
determining the 2D bounding box of the product based on least in part on a convolutional neural network based object detection model and an indication of the first location or the second location.

4. The apparatus of claim 1, wherein the image comprises a plurality of pixels in the 2D bounding box, the operations further comprising:
determining the area corresponding to the 2D bounding box based at least in part on a known reference in the image or the plurality of pixels in the 2D bounding box;
retrieving the standard size of the standard product associated with the label; and
comparing the area corresponding to the 2D bounding box to the standard size of the standard product associated with the label.

5. The apparatus of claim 1, the operations further comprising:
determining the maximum of the standard size of the standard product based at least in part on a longest internal diagonal of a three-dimensional bounding box of the standard product associated with the label.

6. The apparatus of claim 1, wherein detecting the mismatch is further based at least in part on a dissimilarity, measured by a deep metric learning model, between content within the 2D bounding box of the product with known image data associated with the label.

7. The apparatus of claim 1, the operations further comprising:
projecting a 3D representation of the standard product to the 2D plane in a first instance to determine the minimum of the standard size of the standard product; and
projecting the 3D representation of the standard product to the 2D plane in a second instance to determine the maximum of the standard size of the standard product.

8. The apparatus of claim 1, the operations further comprising:
adjusting the standard size of the standard product associated with the label based at least in part on the area corresponding to the 2D bounding box of the product.

9. The apparatus of claim 1, the operations further comprising:
generating an alert based at least in part on the mismatch between the label and the product.

10. A computer-implemented method for detecting mislabeled products, comprising:
synchronizing a first action of generating a machine reading of a label of a product and a second action of capturing an image of the product;
determining an area corresponding to a 2D bounding box of the product in the image, wherein the 2D bounding box encloses the product in the image; and
detecting a mismatch between the label and the product in response to the area corresponding to the 2D bounding box being less than a minimum or greater than a maximum of a standard size of a standard product associated with the label, wherein the minimum and the maximum of the standard size of the standard product associated with the label are determined based on a projection of the standard product on a 2D plane.

11. The method of claim 10, further comprising:
in response to receiving the machine reading of the label, capturing the image of the product in a top-down view.

12. The method of claim 10, further comprising:
identifying a location indication of the product in the image based at least in part on a source device that generated the machine reading of the label; and
determining the 2D bounding box of the product based at least in part on a convolutional neural network based object detection model and the location indication of the product in the image.

13. The method of claim 10, wherein determining the area corresponding to the 2D bounding box comprises:
identifying a predetermined reference in the image; and
determining the area corresponding to the 2D bounding box based at least in part on a known measurement of the predetermined reference.

14. The method of claim 10, wherein determining the area corresponding to the 2D bounding box is based at least in part on pixels in the 2D bounding box and a source device that generated the machine reading of the label.

15. The method of claim 10, wherein detecting the mismatch between the label and the product is further based at least in part on a weight comparison between a weight of the product and a known weight of the standard product associated with the label.

16. The method of claim 10, wherein detecting the mismatch between the label and the product is further based at least in part on a dissimilarity measurement between content within the 2D bounding box of the product and known image data associated with the label.

17. The method of claim 10, further comprising:
adjusting the standard size of the standard product associated with the label based at least in part on the area corresponding to the 2D bounding box of the product.

* * * * *